(12) United States Patent
Kwon et al.

(10) Patent No.: US 6,907,540 B2
(45) Date of Patent: Jun. 14, 2005

(54) REAL TIME BASED SYSTEM AND METHOD FOR MONITORING THE SAME

(75) Inventors: Jin Wook Kwon, Seoul (KR); Suk Won Park, Seoul (KR)

(73) Assignee: LG Electronics Inc., Seoul (KR)

( * ) Notice: Subject to any disclaimer, the term of this patent is extended or adjusted under 35 U.S.C. 154(b) by 617 days.

(21) Appl. No.: 10/112,872

(22) Filed: Apr. 2, 2002

(65) Prior Publication Data

US 2002/0147873 A1 Oct. 10, 2002

(30) Foreign Application Priority Data

Apr. 6, 2001 (KR) ..................................... P2001-18320

(51) Int. Cl.[7] ............................. G06F 1/14; G06F 11/00
(52) U.S. Cl. ........................ 713/502; 713/500; 714/38; 714/55
(58) Field of Search ............................... 713/500, 502; 714/25, 38, 39, 51, 55; 717/124, 127–131, 150, 160; 700/21, 26, 108

(56) References Cited

U.S. PATENT DOCUMENTS

| | | | | |
|---|---|---|---|---|
| 4,837,702 A | * | 6/1989 | Obrea | 705/410 |
| 5,073,853 A | * | 12/1991 | Johnson | 714/23 |
| 6,269,478 B1 | * | 7/2001 | Lautenbach-Lampe et al. | 717/127 |
| 6,412,106 B1 | * | 6/2002 | Leask et al. | 717/124 |
| 6,658,602 B1 | * | 12/2003 | Nakano | 714/38 |
| 6,665,758 B1 | * | 12/2003 | Frazier et al. | 710/200 |
| 6,701,198 B1 | * | 3/2004 | Vandesteeg et al. | 700/79 |
| 6,745,321 B1 | * | 6/2004 | Floyd et al. | 712/227 |

* cited by examiner

*Primary Examiner*—Dennis M. Butler

(74) *Attorney, Agent, or Firm*—Birch, Stewart, Kolasch & Birch, LLP

(57) ABSTRACT

A real time based system and a method for monitoring the same are disclosed, in which applications in operation are monitored by a system monitoring module at a constant time period to detect whether they operate abnormally. The system monitoring module detects whether all the applications currently in operation are controlled normally, so that it is possible to effectively detect any abnormal status of the system in the real time environment. Thus, reliability of the real time based system can be improved.

17 Claims, 2 Drawing Sheets

REAL TIME BASED SYSTEM AND METHOD FOR MONITORING THE SAME

This application claims the benefit of the Korean Application No. P2001-18320 filed on Apr. 6, 2001, which is hereby incorporated by reference.

BACKGROUND OF THE INVENTION

1. Field of the Invention

The present invention relates to a real time based system, and more particularly, to a real time based system and a method for monitoring the same in which an abnormal status of the system can be monitored in the real time environment.

2. Discussion of the Related Art

In the real time system environment, the system may cause error operation due to various factors such as unexpected operation, the outer environment, and latent bug. Such factors cause deadlock or livelock in the system, thereby failing to normally operate a set top box.

The deadlock occurs when a number of applications simultaneously use a restricted hardware resource. Once the deadlock occurs, the applications having no priority should be in a standby status for a while to obtain a desired hardware resource. The applications may be in a standby status permanently as the case may be.

The livelock occurs mainly due to program bug and means that an abnormal loop continues due to internal bug as the hardware resource is not controlled normally.

FIG. 1 illustrates an operating system (OS) and application of a general real time based system.

As shown in FIG. 1, a real time operating system (RTOS) in a real time based system operates respective application codes in order. For example, the applications 1 and 2 operate program codes by means of the RTOS and at the same time control hardware using a device driver. By contrast, an application 3 operates a program code by means of the RTOS only.

However, when a number of applications simultaneously use a restricted hardware resource, it is likely that the deadlock and the livelock occur. Although such deadlock and livelock usually occur under the general personal computer environment, they may fatally deteriorate reliability of the product under the real time environment. Therefore, it is important that the system be shortly recovered to a normal status if the deadlock and the livelock occur.

SUMMARY OF THE INVENTION

Accordingly, the present invention is directed to a real time based system and a method for monitoring the same that substantially obviates one or more problems due to limitations and disadvantages of the related art.

An object of the present invention is to provide a real time based system and a method for monitoring the same in which respective applications are monitored in the real time environment to exactly and quickly detect whether the system is in a deadlock or livelock status.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a real time based system having a real time operating system (RTOS) which selectively operates a plurality of applications, the real time based system includes: a lock counter included in each application, for increasing a certain unit value whenever an operation loop is finished; and a system monitoring module for periodically extracting a lock counter value of the application currently in operation and detecting an abnormal status of the application currently in operation using the extracted lock counter value.

The system monitoring module includes a waiting counter and determines whether the system operates abnormally by comparing a value of the waiting counter with a preset threshold value if the lock counter value does not increase, the waiting counter being initiated if the lock counter value increases and increasing a certain unit value if the lock counter value does not increase.

In another aspect of the present invention, a method for monitoring a real time based system includes the steps of a) periodically extracting a lock counter value of an application having a lock counter when the application operates, the lock counter value being increased whenever an operation loop is finished, b) determining whether the lock counter value periodically extracted increases, c) determining whether a time period with no change of the lock counter value is greater than a preset threshold time period; and d) determining an actual operation status of the application currently in operation if the time period with no change of the lock counter value is greater than the preset threshold time period, thereby determining whether the application operates abnormally.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
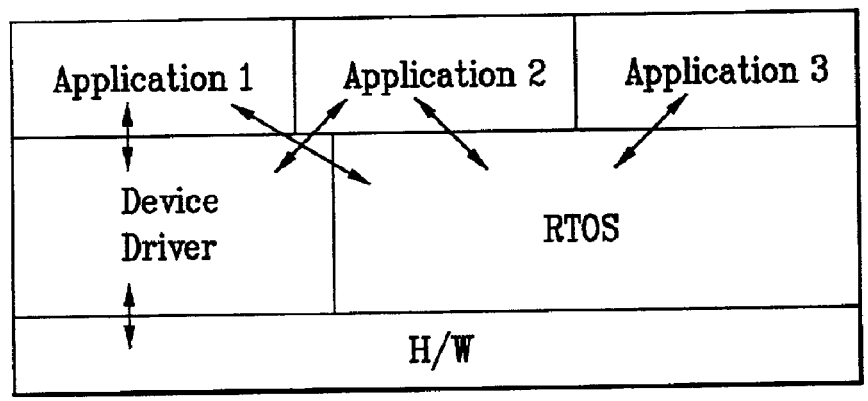
FIG. 1 is a block diagram illustrating a general real time based system.
Figure 2:
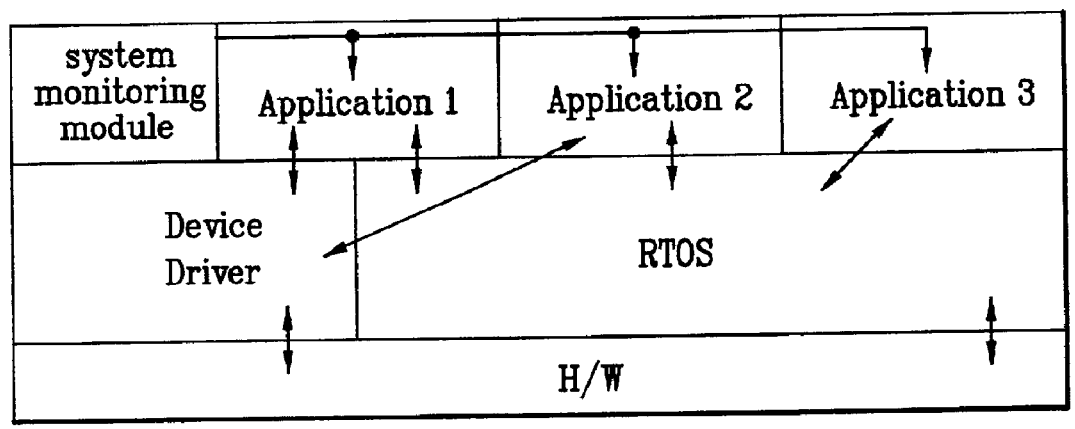
FIG. 2 is a block diagram illustrating a real time based system according to the present invention.

FIG. 2 is a block diagram illustrating a real time based system according to the present invention.

Referring to FIG. 2, the real time based system according to the present invention includes a real time operating system (RTOS) for selectively operating a plurality of applications in order, a lock counter included in each application, for increasing a certain unit value whenever an operation loop (i.e., driving unit of a corresponding application) is finished, and a system monitoring module for periodically extracting a lock counter value of the application currently in operation and detecting an abnormal status of the application currently in operation using the extracted lock counter value.

All the applications are monitored by the system monitoring module. The system monitoring module does not monitor a library such as a device driver but monitors applications in operation to detect whether they operate abnormally.

Figure 3:
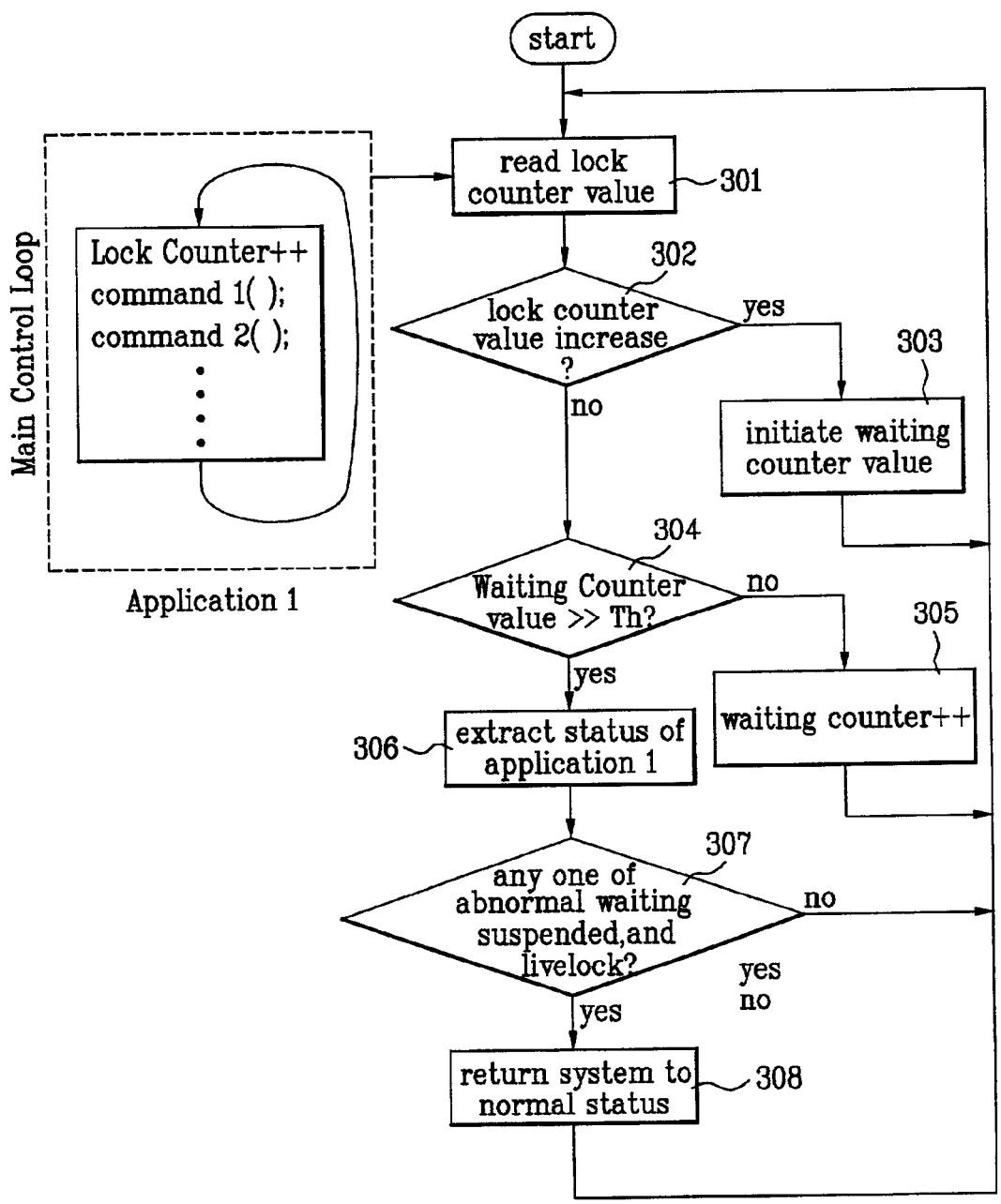
FIG. 3 is a flow chart illustrating a method for monitoring a real time based system according to the present invention.

FIG. 3 is a flow chart illustrating a method for monitoring the real time based system according to the present invention.

In FIG. 3, a left portion denotes an application monitored by the system monitoring module and a right portion denotes a flow chart illustrating the operation of the system monitoring module that monitors the application.

Referring to FIG. 3, there are provided a lock counter and a waiting counter. For example, one application increases the lock counter by 1 whenever the operation loop is finished while continues to maintain the current status if the operation loop is not finished.

The waiting counter increases its value by 1 when its value is smaller than a threshold value Th while the lock counter value does not increase when the lock counter is checked. That is, the waiting counter periodically increases a certain unit value for a time period with no change of the lock counter value.

The increasing widths of the lock counter value and the waiting counter value depend on designers.

Also, it is assumed that the application 1 of FIG. 2 is provided. In this case, the system monitoring module periodically extracts the lock counter value from the application 1 at a constant time period in step 301. The constant time period may depend on designers.

The lock counter value extracted in the step S301 is compared with a previous value so as to determine whether the lock counter value has increased in step 302. Then, a newly extracted lock counter value is stored to be used as a next comparison value.

In the step 302, if it is determined that the lock counter value has increased, the operation loop of the application 1 operates normally. Therefore, it is determined that the system has no error, and the waiting counter value is initiated at 0 in step 303 to return to the step 301.

Meanwhile, in the step 302, if it is determined that the lock counter value has not increased, it is likely that the operation loop of the application 1 does not operate normally. Therefore, step 304 is implemented to check that the operation loop of the application 1 does not operate normally.

In the step 304, the waiting counter value is used to compare the time period having no increased lock counter value with a preset threshold time period. The preset threshold time period is determined by repeated experiments of designers.

For example, supposing that the application, i.e., the system operates abnormally when the time period where the lock counter value is extracted is 1 second and the time period where the lock counter value does not increase exceeds 10 seconds, the threshold time period is determined as 10 seconds and the threshold value Th is determined as 10.

If the writing counter value is smaller than or equal to the threshold value Th in the step 304, it is determined that the system operates normally, and the waiting counter value increases by 1 and then the step 301 is implemented in step 305.

In other words, if the writing counter value is smaller than or equal to the threshold value Th, an operation time period of a main loop of the application 1 is greater than the time period where the lock counter value is extracted or the system waits for user input in a normal status.

Therefore, in the present invention, to prevent the normal standby status from being determined as the deadlock, the waiting counter value is compared with the threshold value Th.

In the step 304, if the waiting counter value is greater than the threshold value Th, it is likely that abnormal status occurs. Therefore, the exact status of a corresponding application is extracted in step 306.

At this time, information on an actual operation status of a corresponding application provided by the real time operating system is determined to extract the exact status of the application.

In the step 306, if the actual operation status of the corresponding application corresponds to abnormal waiting, suspended, or livelock, it is determined that the application operates abnormally, and step 308 is implemented for system recovery. After the system is recovered to the normal status in the step 308, the step 301 is implemented.

Meanwhile, if the actual operation status extracted in the step 306 corresponds to none of abnormal waiting, suspended, and livelock, it is determined that the system operates normally, and the step 301 is implemented.

The monitoring step of the application 1 is periodically repeated at a constant time period as shown in FIG. 3.

Also, all the applications currently in operation operate as shown in FIG. 3.

The step of monitoring the applications currently in operation continues to operate as far as the system operates.

As aforementioned, the real time based system and the method for monitoring the same have the following advantages.

All the applications currently in operation are periodically monitored at a constant time period to detect whether the respective applications are controlled normally.

Furthermore, it is possible to prevent the standby status from being determined as an abnormal status using information on an actual operation status of the application provided by the real time operating system. Therefore, the abnormal status of the system can effectively be detected in the real time environment, so that reliability of the real time based system can be improved.

Moreover, the system monitoring module of the present invention can widely be used for various embedded systems in the future.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A real time based system having a real time operating system (RTOS) which selectively operates a plurality of applications, the real time based system comprising:
   a lock counter included in each application, for increasing a certain unit value whenever an operation loop is finished; and a system monitoring portion for periodically extracting a lock counter value of the application currently in operation and detecting an abnormal status of the application currently in operation using the extracted lock counter value.

2. The real time based system of claim 1, wherein the system monitoring portion includes a waiting counter that periodically increases a certain unit value for a time period with no change of the periodically extracted lock counter value.

3. The real time based system of claim 2, wherein the system monitoring portion compares the time period with no change of the lock counter value with a preset threshold time period using the waiting counter.

4. The real, time based system of claim 1, wherein the system monitoring portion determines the application operates normally if the lock counter value increases.

5. The real time based system of claim 4, wherein the system monitoring portion is initiated after determining that the application operates normally.

6. The real time based system of claim 1, wherein the system monitoring portion determines whether the application operates abnormally using information on an actual operation status of the application provided by the real time operating system if the lock counter value does not increase for the preset threshold time period.

7. The real time based system of claim 6, wherein the system monitoring portion determines that the application operates abnormally if the actual operation status of the application corresponds to abnormal waiting, suspended, or livelock.

8. A real time based system having a real time operating system (RTOS) which selectively operates a plurality of applications, the real time based system comprising:

a lock counter included in each application, for increasing a certain unit value whenever an operation loop is finished; and a system monitoring portion for periodically extracting a lock counter value of the application currently in operation, determining that the application operates normally if the extracted lock counter value increases, and determining that the application currently in operation operates abnormally using information on an actual operation status of the application provided by the real time operating system if the extracted lock counter value does not increase.

9. The real time based system of claim 8, wherein the system monitoring portion includes a waiting counter that periodically increases a certain unit value for a time period with no change of the lock counter value.

10. The real time based system of claim 9, wherein the system monitoring portion compares the time period with no change of the lock counter value with a preset threshold time period using the waiting counter.

11. The real time based system of claim 8, wherein the system monitoring portion is initiated after determining that the application operates normally.

12. The real time based system of claim 8, wherein the system monitoring portion determines whether the application operates abnormally if the actual operation status of the application corresponds to abnormal waiting, suspended, or livelock.

13. A method for monitoring a real time based system comprising the steps of:

a) periodically extracting a lock counter value of an application having a lock counter when the application operates, the lock counter value being increased whenever an operation loop is finished;

b) determining whether the lock counter value periodically extracted increases;

c) determining whether a time period with no change of the lock counter value is greater than a preset threshold time period; and d) determining an actual operation status of the application currently in operation if the time period with no change of the lock counter value is greater than the preset threshold time period, thereby determining whether the application operates abnormally.

14. The method of claim 13, wherein the step b) includes the step of determining that the application operates normally if the lock counter value increases.

15. The method of claim 13, wherein the step c) includes the step of determining that the application operates normally if the time period with no change of the lock counter value is not greater than the preset threshold time period.

16. The method of claim 13, wherein the step d) includes the step of determining that the application operates abnormally if the actual operation status of the application corresponds to abnormal waiting, suspended, or livelock.

17. The method of claim 13, wherein the step d) includes the step of determining that the application operates normally if the actual operation status of the application corresponds to none of abnormal waiting, Suspended and livelock.

* * * * *